Figure 1:
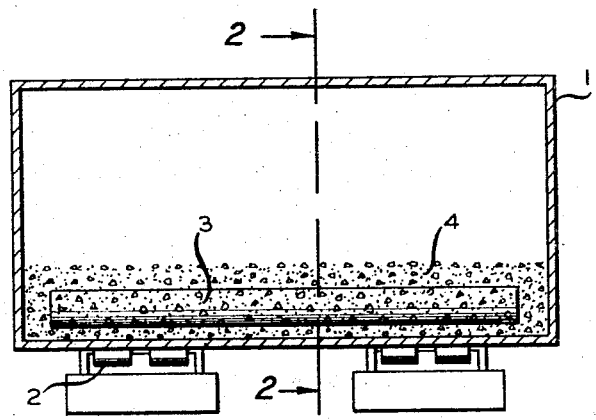

May 9, 1967     D. G. NEEDHAM     3,318,538

DRY BLENDING

Filed Dec. 8, 1964

INVENTOR
D. G. NEEDHAM
BY
ATTORNEYS

United States Patent Office 3,318,538
Patented May 9, 1967

3,318,538
DRY BLENDING
Donald G. Needham, Ramona, Okla., assignor to Phillips Petroleum Company, a corporation of Delaware
Filed Dec. 8, 1964, Ser. No. 416,712
6 Claims. (Cl. 241—178)

This invention relates to dry blending. In one of its aspects, it relates to a method for dry blending polymers with fillers therefor, said method comprising feeding the polymers and fillers to a blending zone, therein blending the polymer and the filler by rotational motion, and contacting said polymer and said filler with a solid member to break up agglomerates of polymer and filler. In another of its aspects, the invention relates to an apparatus for dry blending a polymer with fillers such as pigments comprising a drum with a means for rotating said drum around a horizontal axis, and at least one solid circular prism contained within the drum and adapted to move freely within the drum as said drum rotates.

Difficulty has been encountered in obtaining satisfactory dispersions of particulate polymers and fillers, such as pigments and dyes, when dry blending or tumbling the polymers with the pigments. Such blends are used to make objects by extruding, injection molding, blow molding, and the like. It has been found that an efficient dispersion of a pigment in a polymer can be made only if the pigment is in the comminuted state just prior to the blending operation. Pigment, upon standing for a relatively short period of time has been found to re-agglomerate. Thus, sifting or comminution of the pigment must be done before blending the same with the polymer. I have now found that the blending and the comminution of fillers, such as pigment, can be carried out simultaneously, with substantial savings in time, by mixing the polymer and pigment in a rotary drum containing a heavy object.

Rotating drums containing heavy objects such as cylindrical rods have been used for compacting fillers, such as carbon black, for comminuting solids slurried in liquids, and for dispersing solids in liquids. Surprisingly, I have found that such a rotary drum containing at least one heavy object such as a rod or ball can be used to carry out simultaneous comminuting of agglomerated fillers such as pigment, and dry blending polymers with said fillers.

It is therefore an object of this invention to provide a dry blending operation. It is a further object of this invention to provide a method for improving the dry blending of polymers and pigments. It is a further object of this invention to provide an apparatus to carry out the process of this invention.

Other aspects, objects and the several advantages of this invention are apparent to one skilled in the art from a study of this disclosure, the drawings and the appended claims.

According to the invention, there is provided a dry blending operation wherein particulate polymers such as polyethylene and fillers such as pigments are added to a blender such as a tumbler. The blending operation is carried out in the presence of a heavy object such as a solid rod which breaks up the agglomerates or lumps of pigment and aids in uniformly blending the pigment and the polymer.

The polymer in this invention can be any thermoplastic or thermosetting polymer in particulate form. Suitable polymers are polyethylene, polypropylene, polybutene and copolymers thereof, polyvinyl, chloride, polystyrene, and the like.

Figure 2:
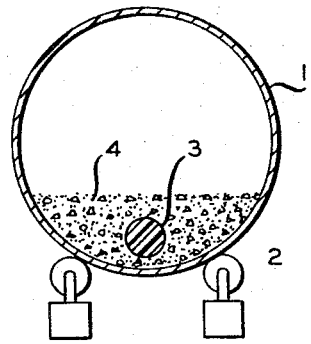
Figure 3:
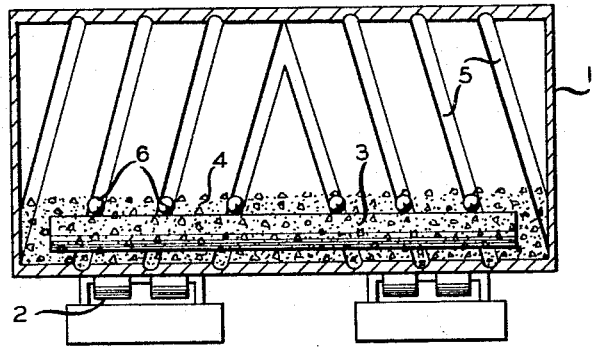

The invention can be better understood by reference to the accompanying drawings. FIGURE 1 shows a cross-section to a drum tumbler. FIGURE 2 is a cross-section to 2—2 of FIGURE 1. FIGURE 3 is a longitudinal cross-section through an apparatus containing a combination of rods and balls.

Referring now to the drawings, a longitudinal tumbler 1 is supported by rotating means 2 and has within it a large rod 3 and a mixture of pigment and a particulate polymer 4. The rotating means can be any suitable means for causing the drum to rotate about a longitudinal axis. For convenience, a series of rollers has been shown. The solid rod within the longitudinal tumbler can be made of any material which will break up agglomerates of filler or pigment as the drum rotates. In a preferred embodiment, the drum rotates around a horizontal axis and the drum is horizontal. However, it is within the scope of the invention to have the longitudinal tumbler at an angle to the horizontal and have the tumbler rotate around a horizontal axis; or the longitudinal tumbler may be at an angle to the horizontal and rotate about an axis at an angle to the horizontal. Thus, the weight of the rod is important. Suitable rods can be made from polyethylene and other thermoplastic materials as well as metals such as steel, aluminum, and the like.

The heavy object can have a number of configurations. For example, it could be a long, cylindrical rod or a rod of conical shape. Further, the heavy object could be a rod which has a square shape or some other regular polygon shape in cross-section. Still further, the heavy object can be a ball or a plurality of balls. It is within the scope of the invention to use a plurality of rods or any combination of rods and balls. A preferred embodiment is to use a longitudinal rod composed of polyethylene.

Referring now to FIGURE 3, the inside of tumbler 1 contains a series of spiral grooves 5 suitable for retaining balls 6 therein. As the tumbler rotates, the balls will have a tendency to roll toward the center or toward the ends of the tumbler depending on the direction of the rotation. As the balls contact the central portion of the tumbler, they hop up out of one groove into the next groove. There can be one series or a plurality of series of grooves. The combination of rod 3 and balls 6 serve to comminute the filler or pigment while blending the same with polymer. The balls can be made from material the same as or different from the composition of the rod or rods.

In operation, as the drum rotates the polymer 4 is tumbled and rod 3, being unrestrained, beats against the mixture of polymer and pigments to break up any agglomerates. The rod being relatively heavy will remain substantially in the bottom of the tumbler, and the tumbler will not rotate fast enough to move the rod by centrifugal force from the bottom of the tumbler.

*Specific example*

Tests were carried out in a 35 gallon tumbler using a polyethylene rod two feet long and three inches in diameter. A suitable blend of polyethylene and pigment was obtained using the following procedure:

(A) sifting pigment and blending sifted pigment with polyethylene for 10 minutes without the use of a solid rod in blender;
(B) unsifted pigment, polyethylene, blended for 40 minutes in tumbler without solid rod;
(C) unsifted pigment and polyethylene were blended in the tumbler with the rod for 10 minutes.

It can be seen from the above example that the use of the solid rod in the tumbler greatly improves the method of blending pigment with polyethylene. In this particular example, the time of blending was reduced 75 percent.

Reasonable variation and modification are possible within the scope of the foregoing disclosure, drawing and the appended claims of the invention the essence of which is that dry blending of polymer and fillers such as pigment is carried out in a rotating drum containing a heavy object.

I claim:

1. A method of dry blending a particulate polymer with a pigment comprising feeding agglomerated pigment and particulate polymer into a tumbler, rotating said tumbler about a horizontal axis, contacting said pigment and said polymer with a rod substantially large enough to comminute agglomerated pigment, and allowing the rod to fall freely within the tumbler as it rotates.

2. A method according to claim 1 wherein said polymer is selected from the group consisting of polyethylene, polypropylene, polybutene and copolymers thereof.

3. In a dry blending operation wherein pigment and polymer are blended in a rotating blender, the improvement which comprises blending said polymer and pigment in the presence of an unrestrained solid rod which moves freely within said rotating blender.

4. A method according to claim 3 wherein said polymer is selected from the group consisting of polyethylene, polypropylene, polybutene and copolymers thereof.

5. In a method for blending a particulate polymer and a filler which has a tendency to agglomerate and wherein said filler is normally comminuted prior to blending, the improvement which comprises simultaneously comminuting and blending said filler with said polymer by blending said filler and said polymer in a comminuting zone.

6. A method according to claim 5 wherein said polymer is selected from the group consisting of polyethylene, polypropylene, polybutene and copolymers thereof.

References Cited by the Examiner

UNITED STATES PATENTS

| | | | |
|---|---|---|---|
| 1,907,080 | 5/1933 | McMillan | 241—170 |
| 2,586,338 | 2/1952 | Hushley et al. | 241—184 |
| 2,681,210 | 6/1954 | Schaefer | 241—176 |
| 2,801,804 | 8/1957 | Frankert | 241—184 |
| 3,027,105 | 3/1962 | Hall | 241—177 |
| 3,124,314 | 3/1964 | Klein | 241—184 |

WILLIAM W. DYER, JR., *Primary Examiner.*

G. A. DOST, *Assistant Examiner.*